United States Patent
Kawaguchi

(10) Patent No.: US 9,578,194 B2
(45) Date of Patent: Feb. 21, 2017

(54) IMAGE FORMING APPARATUS USING SYNC SIGNALS FOR DUPLEX SCANNING

(71) Applicant: KYOCERA Document Solutions Inc., Osaka-shi, Osaka (JP)

(72) Inventor: Shinichi Kawaguchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/944,145

(22) Filed: Nov. 17, 2015

(65) Prior Publication Data

US 2016/0150108 A1     May 26, 2016

(30) Foreign Application Priority Data

Nov. 25, 2014    (JP) .................................. 2014-237796

(51) Int. Cl.
     *H04N 1/00*          (2006.01)
     *H04N 1/19*          (2006.01)
     *H04N 1/23*          (2006.01)

(52) U.S. Cl.
CPC ........ *H04N 1/00649* (2013.01); *H04N 1/0032* (2013.01); *H04N 1/19* (2013.01); *H04N 1/2369* (2013.01); *H04N 2201/0094* (2013.01); *H04N 2201/33335* (2013.01)

(58) Field of Classification Search
CPC . H04N 1/00649; H04N 1/2369; H04N 1/0032
USPC ......... 358/1.13, 474, 498, 505; 399/16, 367, 399/371
See application file for complete search history.

(56) References Cited

U.S. PATENT DOCUMENTS

| | | | |
|---|---|---|---|
| 2004/0027620 A1* | 2/2004 | Tseng | H04N 1/00572 358/474 |
| 2012/0086960 A1* | 4/2012 | Kawabe | H04N 1/6091 358/1.9 |
| 2015/0277815 A1* | 10/2015 | Ohhashi | G06F 3/1285 358/1.12 |

FOREIGN PATENT DOCUMENTS

| | | |
|---|---|---|
| JP | H11331493 A | 11/1999 |
| JP | 2004266439 A | 9/2004 |
| JP | 2007082033 A | 3/2007 |
| JP | 2011160362 A | 8/2011 |

\* cited by examiner

*Primary Examiner* — Eric A Rust
(74) *Attorney, Agent, or Firm* — Alleman Hall McCoy Russell & Tuttle LLP

(57) ABSTRACT

In an image reading device, a sync signal outputting portion alternately outputs a first sync signal and a second sync signal while the document sheet is moving in a range including a first position and a second position in a conveyance path. A first image sensor and a second image sensor read images from both sides of a document sheet and output image signals in synchronization with the first sync signal and the second sync signal, respectively. An AFE performs a predetermined signal processing in sequence to the image signals that are output alternately.

6 Claims, 6 Drawing Sheets

IMAGE FORMING APPARATUS USING SYNC SIGNALS FOR DUPLEX SCANNING

INCORPORATION BY REFERENCE

This application is based upon and claims the benefit of priority from the corresponding Japanese Patent Application No. 2014-237796 filed on Nov. 25, 2014, the entire contents of which are incorporated herein by reference.

BACKGROUND

The present disclosure relates to an image reading device, an image forming apparatus, and an image reading method.

In general, there has been known an image reading device that includes an ADF (Automatic Document Feeder) and two image sensors. The ADF conveys a document sheet along a predetermined document sheet conveyance path. In addition, in a double-side mode in which images are read from both sides of the document sheet, the two image sensors respectively read the images from both sides of the document sheet that is moving in the document sheet conveyance path, and output image signals that respectively correspond to the read images.

In addition, the image signals that are analog, are converted to digital image data by signal conversion circuits such as AFEs (Analog Front Ends). Furthermore, an image processing portion performs various types of image processing to the digital image data.

Furthermore, the image reading device includes two CISs (Contact Image Sensors) for reading the images from both sides of the document sheet. In that case, the signal conversion circuit is provided for each of the CISs.

SUMMARY

An image reading device according to an aspect of the present disclosure includes a document sheet conveying portion, a sync signal outputting portion, a first image sensor, a second image sensor, and an image signal processing portion. The document sheet conveying portion conveys a document sheet along a predetermined document sheet conveyance path. The sync signal outputting portion, in a double-side mode, alternately outputs a first sync signal and a second sync signal while the document sheet is moving in a range including a first position and a second position in the document sheet conveyance path, the double-side mode being a mode in which images are read from both sides of the document sheet. The first image sensor reads an image from a first surface of the document sheet and outputs a first image signal corresponding to the image read at the first position, in synchronization with the first sync signal. The second image sensor reads an image from a second surface of the document sheet at the second position and outputs a second image signal corresponding to the image read at the second position, in synchronization with the second sync signal. The image signal processing portion performs a predetermined signal processing in sequence to the first image signal and the second image signal that are output alternately from the first image sensor and the second image sensor.

An image forming apparatus according to another aspect of the present disclosure includes the image reading device according to an aspect of the present disclosure.

An image reading method according to still another aspect of the present disclosure is a method for reading images from both sides of a document sheet conveyed along a predetermined document sheet conveyance path. The method includes alternately outputting a first sync signal and a second sync signal by a sync signal outputting portion while the document sheet is moving in a range including a first position and a second position in the document sheet conveyance path. The method also includes reading, by a first image sensor, an image from a first surface of the document sheet at the first position and outputting a first image signal corresponding to the image read at the first position, in synchronization with the first sync signal. The method further includes reading, by a second image sensor, an image from a second surface of the document sheet at the second position and outputting a second image signal corresponding to the image read at the second position, in synchronization with the second sync signal. The method further includes performing, by an image signal processing portion, a predetermined signal processing in sequence to the first image signal and the second image signal that are output alternately from the first image sensor and the second image sensor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
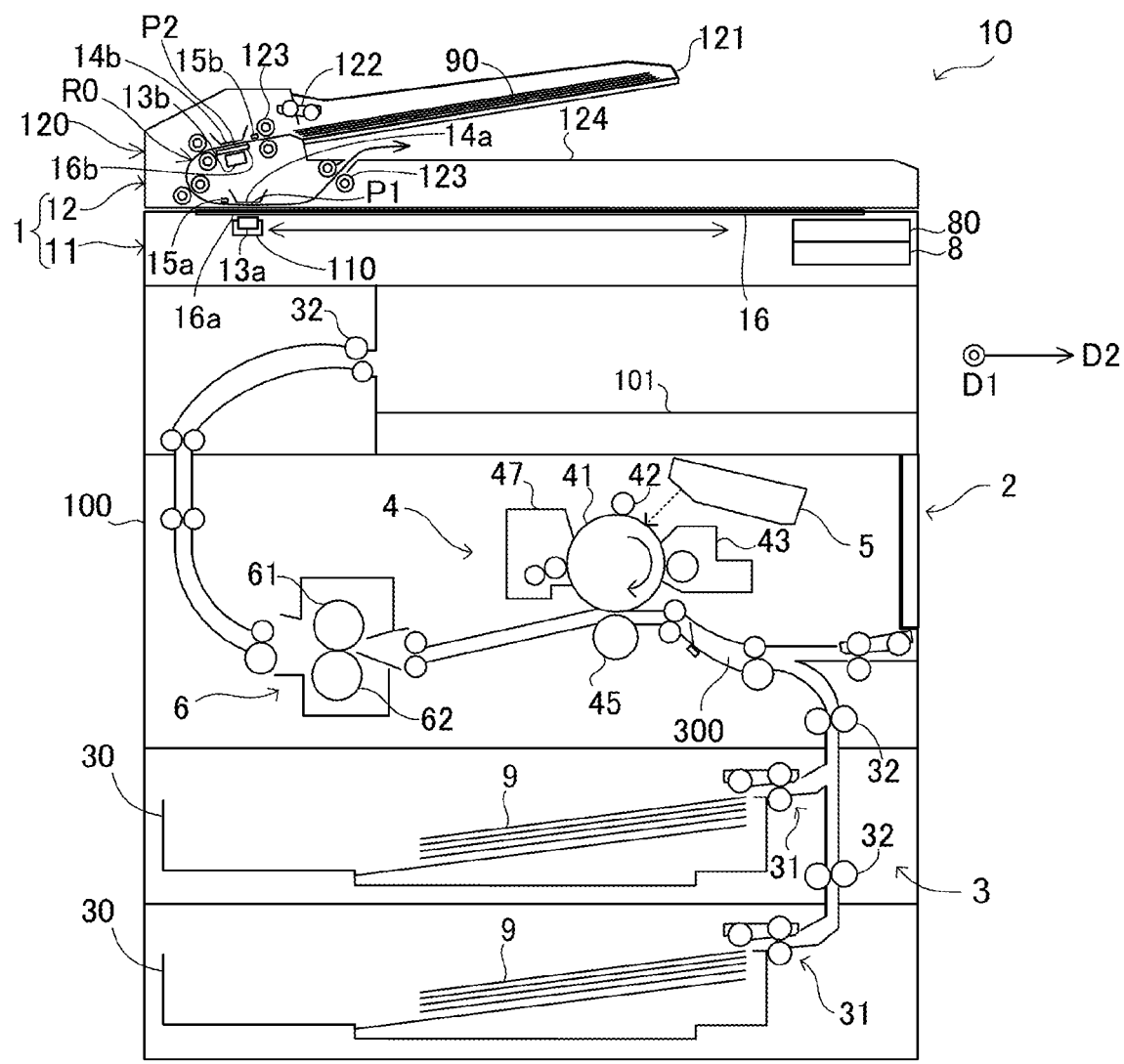
FIG. 1 is a diagram showing the configuration of an image forming apparatus including an image reading device according to an embodiment of the present disclosure.

The following describes an embodiment of the present disclosure with reference to the attached drawings. It should be noted that the following embodiments are examples of specific embodiments of the present disclosure and should not limit the technical scope of the present disclosure.

[Configuration of Apparatus]

First, a description is given of the configuration of an image reading device 1 according to the embodiment and the configuration of an image forming apparatus 10 including the image reading device 1, with reference to FIGS. 1-4. The image forming apparatus 10 includes a main body portion 2 and the image reading device 1. In addition, the image forming apparatus 10 includes an operation display portion 80 and a control portion 8, wherein the control portion 8 controls devices included in the main body portion 2 and the image reading device 1.

The image forming apparatus 10 is, for example, a copier, a printer or a facsimile having functions of a copier, or a multifunction peripheral having a plurality of image processing functions including an image reading function.

<Image Reading Device 1>

Figure 2:
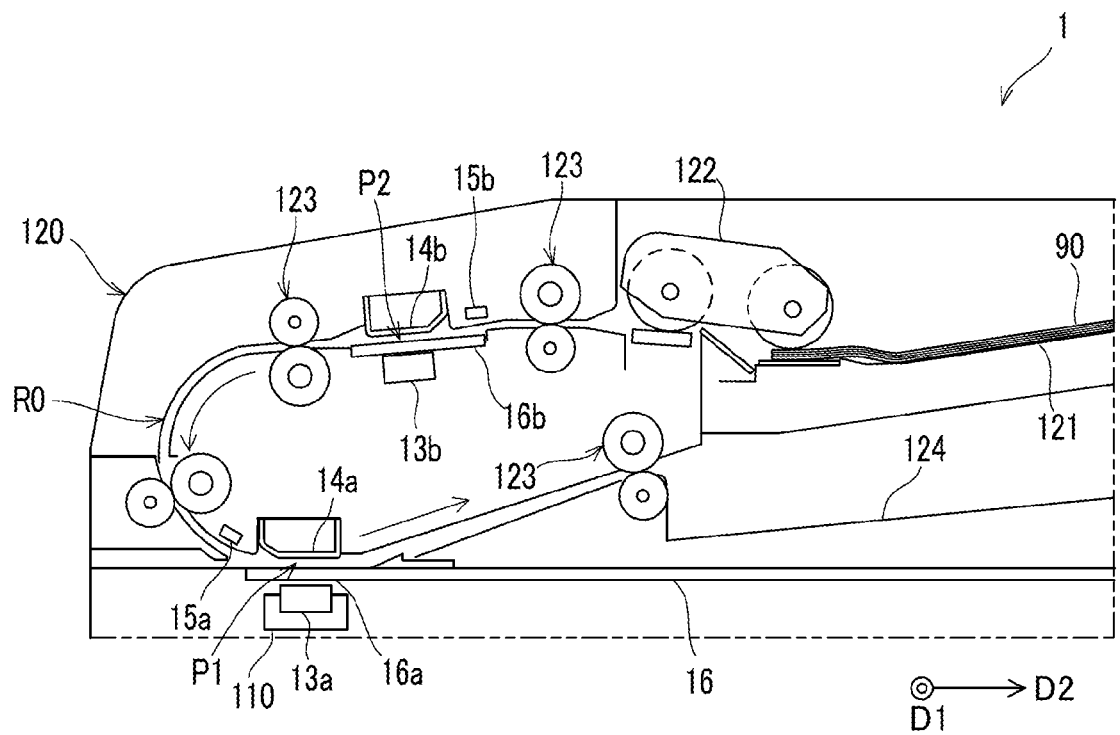
FIG. 2 is a diagram showing the configuration of an ADF and its peripheral in the image reading device according to an embodiment of the present disclosure.

As shown in FIGS. 1 and 2, the image reading device 1 includes a document sheet scanning unit 11 and a document sheet table cover 12. The document sheet table cover 12 is supported so as to be pivoted with respect to the document sheet scanning unit 11. The document sheet scanning unit 11 includes a transparent document sheet table 16. The document sheet table cover 12 is pivotable between a closing position and an opening position. When the document sheet table cover 12 is at the closing position, it covers the upper surface of the document sheet table 16, and when the document sheet table cover 12 is at the opening position, the upper surface of the document sheet table 16 is exposed for use.

The document sheet table 16 is a portion on which a document sheet 90 as an image reading target is placed. In general, the document sheet table 16 is called platen glass.

The image scanning portion 11 further includes a first image sensor 13a and a scanning mechanism 110. In the following description, one direction in a horizontal plane is referred to as a main scanning direction D1; and a direction perpendicular to the main scanning direction D1 is referred to as a sub scanning direction D2.

The first image sensor 13a reads a line of image which extends along the main scanning direction D1, from a document sheet 90 and outputs a first image signal Ia1 corresponding to the read image. The scanning mechanism 110 causes the first image sensor 13a to move reciprocally along the sub scanning direction D2, at a position close to the document sheet table 16.

The first image sensor 13a reads an image of the document sheet 90 placed on the document sheet table 16, by moving along the sub scanning direction D2.

The document sheet table cover 12 includes an ADF 120 embedded therein. The ADF 120 includes a document sheet supply tray 121, a document sheet feeding mechanism 122, a document sheet conveying mechanism 123, and a document sheet discharge tray 124. The document sheet feeding mechanism 122 feeds, one by one, document sheets 90 set on the document sheet supply tray 121 into a document sheet conveyance path R0.

The document sheet conveyance path R0 is formed along a predetermined route that passes through a first position P1 and a second position P2, wherein the first position P1 extends along a first contact portion 16a that is a part of the document sheet table 16, and the second position P2 is set in the document sheet table cover 12.

In addition, a transparent second contact portion 16b is fixed in a state of extending along the second position P2.

The scanning mechanism 110 can hold the first image sensor 13a at a position where it faces the first position P1. The first image sensor 13a is held in a state of facing the first position P1 across the transparent first contact portion 16a.

The document sheet conveying mechanism 123 conveys, along the document sheet conveyance path R0, the document sheet 90 fed from the document sheet feeding mechanism 122, and discharges the document sheet 90 onto the document sheet discharge tray 124. The document sheet conveying mechanism 123 includes a pair of rollers and a motor, wherein the pair of rollers are configured to rotate while nipping the document sheet 90 therebetween, and the motor configured to rotationally drive one of the pair of rollers. The document sheet conveying mechanism 123 is an example of the document sheet conveying portion.

It is noted that the main scanning direction D1 is perpendicular to a conveyance direction of the document sheet 90 in the document sheet conveyance path R0. In the following description, an upstream side and a downstream side in the conveyance direction of the document sheet 90 in the document sheet conveyance path R0 are referred to as a conveyance upstream side and a conveyance downstream side, respectively.

In the example shown in FIGS. 1 and 2, the first position P1 is positioned in the conveyance downstream side of the second position P2. In other words, the second position P2 is positioned in the conveyance upstream side of the first position P1. However, the second position P2 may be positioned in the conveyance downstream side of the first position P1.

The ADF 120 operates when the document sheet table cover 12 is at the closing position and the first image sensor 13a is facing the first position P1.

In addition, a second image sensor 13b is provided in the document sheet table cover 12. The second image sensor 13b is of the same type as the first image sensor 13a.

The second image sensor 13b is fixed to a position that faces the second position P2 in the document sheet conveyance path R0. The second image sensor 13b is fixed in a state of facing the second position P2 across the transparent first contact portion 16a.

The first image sensor 13a reads images from a first surface of the document sheet 90 at the first position P1 while the document sheet 90 is moving, and outputs first image signals Ia1 that correspond to the read images. On the other hand, the second image sensor 13b reads images from a second surface of the document sheet 90 at the second position P2 while the document sheet 90 is moving, and outputs second image signals Ia2 that correspond to the read images. The first image signal Ia1 and the second image signal Ia2 are analog signals.

Figure 3:
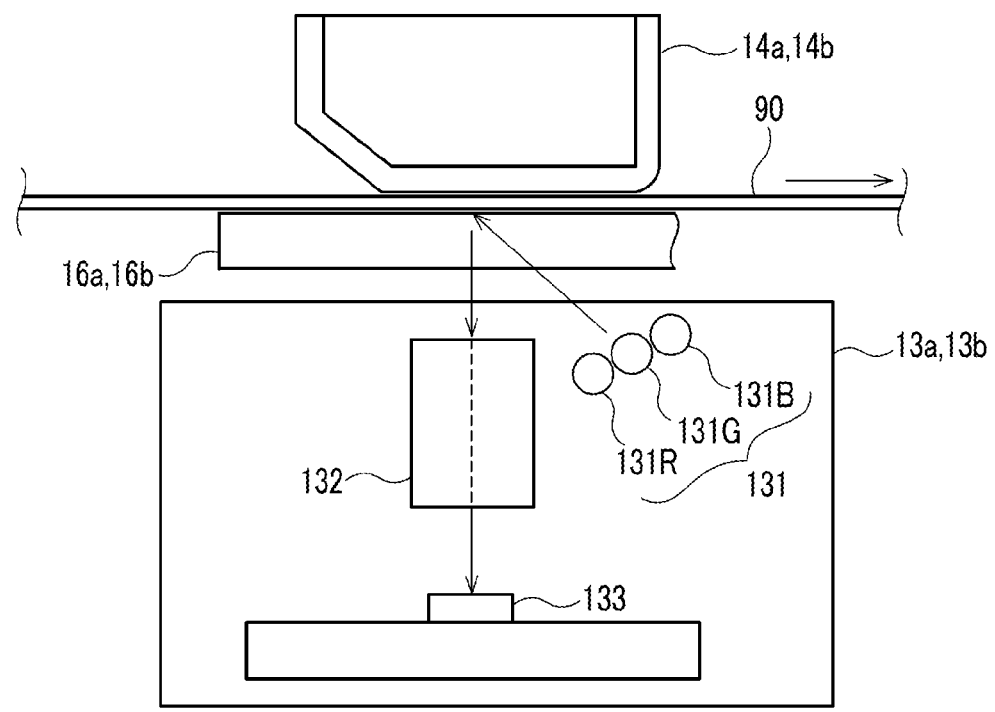
FIG. 3 is a diagram showing the configuration of an image sensor and its peripheral in the image reading device according to an embodiment of the present disclosure.

In the present embodiment, the first image sensor 13a and the second image sensor 13b are CISs. As shown in FIG. 3, the CIS includes bar-like light-emitting portions 131, a bar-like lens 132, and a photoelectric conversion element array 133. The light-emitting portions 131 include a red light-emitting portion 131R, a green light-emitting portion 131G, and a blue light-emitting portion 131B. The light-emitting portions 131 and the lens 132 are each formed in a shape of a bar that extends along the main scanning direction D1.

Each of the light-emitting portions 131 emits a sheet-like light beam toward the document sheet 90 that is moving in the document sheet conveyance path R0. Each of the light-emitting portions 131 may be, for example, a LED array composed of a plurality of light-emitting diodes arrayed along the main scanning direction D1. Alternatively, each of the light-emitting portions 131 may include one or more light sources and an optical system that includes a cylindrical lens that converts the light emitted from the light sources into a sheet-like light beam.

The light-emitting portions 131 of the first image sensor 13a emit light at the first position P1 toward the document sheet 90 via the first contact portion 16a. The light-emitting portions 131 of the second image sensor 13b emit light at the second position P2 toward the document sheet 90 via the second contact portion 16b.

The lens 132 condenses light emitted from a line-like area of the document sheet 90 to a light receiving portion of the photoelectric conversion element array 133, the line-like area extending along the main scanning direction D1.

The photoelectric conversion element array 133 includes a plurality of photoelectric conversion elements arrayed along the main scanning direction D1. In general, the photoelectric conversion elements are CMOS image sensors. Each of the photoelectric conversion elements in the photoelectric conversion element array 133 detects an amount of light emitted from a corresponding pixel in the line-like area. The photoelectric conversion element array 133 outputs, as an image signal of the line-like area, a signal representing detected amount of the light emitted from the pixels.

The photoelectric conversion element array 133 reads lines of images from the document sheet 90 one by one by detecting, in sequence, the amount of light emitted from the line-like area of the document sheet 90 that is being conveyed, the lines of images each extending along the main scanning direction D1.

The amount of light detected by the photoelectric conversion element array 133 is an index value of the image density of the document sheet 90. That is, the smaller the amount of light detected by the photoelectric conversion element array 133 is, the larger the image density of the document sheet 90 is.

In the process of reading images from the document sheet 90, the red light-emitting portion 131R, the green light-emitting portion 131G, and the blue light-emitting portion 131B are lighted in sequence such that red light, green light, and blue light are emitted in sequence toward the document sheet 90. This allows the photoelectric conversion element array 133 to output, in sequence, three first image signals Ia1 that represent densities of a red image, a green image, and a blue image of the document sheet 90. This enables the image of the document sheet 90 to be read as a color image.

In addition, when the image of the document sheet 90 is to be read as a monochrome image, the monochrome image is synthesized from the images of the three colors. It is noted that when the image of the document sheet 90 is to be read as a monochrome image, the red light-emitting portion 131R, the green light-emitting portion 131G, and the blue light-emitting portion 131B may be lighted at the same time such that white light is emitted toward the document sheet 90. In that case, the photoelectric conversion element array 133 outputs the first image signal Ia1 representing the density of the monochrome image.

The first contact portion 16a and a first standard color portion 14a are disposed to face each other in both sides of the document sheet conveyance path R0 at the first position P1. The first image sensor 13a and the first standard color portion 14a face each other across the transparent first contact portion 16a. Similarly, the second contact portion 16b and a second standard color portion 14b are disposed to face each other in both sides of the document sheet conveyance path R0 at the second position P2. The second image sensor 13b and the second standard color portion 14b face each other across the transparent second contact portion 16b.

A surface of the first standard color portion 14a that faces the first image sensor 13a has a standard color that is uniform and has high reflectivity. Similarly, a surface of the second standard color portion 14b that faces the second image sensor 13b has the standard color. In general, the standard color is white. The standard color may be light yellow or the like.

The image reading device 1 executes an image sensor adjustment process at a predetermined timing. In the image sensor adjustment process, the first image sensor 13a is activated when the document sheet 90 is not present at the first position P1. Furthermore, the received light amount detection gain of the first image sensor 13a is automatically adjusted by making comparison between the output signal of the first image sensor 13a and a predetermined standard signal.

Similarly, in the image sensor adjustment process, the second image sensor 13b is activated when the document sheet 90 is not present at the second position P2. Furthermore, the received light amount detection gain of the second image sensor 13b is automatically adjusted by making comparison between the output signal of the second image sensor 13b and a predetermined standard signal.

The image reading device 1 further includes document sheet sensors 15a and 15b that detect whether or not the document sheet 90 is present at the first position P1 and the second position P2 respectively while the document sheet 90 is moving in the document sheet conveyance path R0. The image reading device 1 of the present embodiment includes a first document sheet sensor 15a and a second document sheet sensor 15b.

The first document sheet sensor 15a detects whether or not the document sheet 90 is present at a predetermined position that is in the conveyance upstream side of the first position P1 in the document sheet conveyance path R0. In addition, the second document sheet sensor 15b detects whether or not the document sheet 90 is present at a predetermined position that is in the conveyance upstream side of the second position P2 in the document sheet conveyance path R0.

The first document sheet sensor 15a and the second document sheet sensor 15b may be, for example, reflection-type photosensors, transmission-type photosensors, or contact-type microswitches.

The time point at which the front end of the document sheet 90, while moving in the document sheet conveyance path R0, reaches the first position P1 is a time point at which a first set time has passed since the change of the detection signal of the first document sheet sensor 15a from a non-active state to an active state. In addition, the time point at which the rear end of the document sheet 90 passes the first position P1 is a time point at which the first set time has passed since the change of the detection signal of the first document sheet sensor 15a from the active state to the non-active state. The first set time is set in advance based on the length between the position of the first document sheet sensor 15a and the first position P1 measured along the document sheet conveyance path R0, and based on the conveyance speed of the document sheet 90.

Similarly, the time point at which the front end of the document sheet 90 reaches the second position P2 is a time point at which a second set time has passed since the change of the detection signal of the second document sheet sensor 15b from the non-active state to the active state. In addition, the time point at which the rear end of the document sheet 90 passes the second position P2 is a time point at which the second set time has passed since the change of the detection signal of the second document sheet sensor 15b from the active state to the non-active state. The second set time is set in advance based on the length between the position of the second document sheet sensor 15b and the second position P2 measured along the document sheet conveyance path R0, and based on the conveyance speed of the document sheet 90.

As a result, in the present embodiment, a first time period is defined as a time period required for the front end of the document sheet 90 to reach the first position P1 from the second position P2 in the document sheet conveyance path R0. In other words, the first time period is from a first time point to a second time point, wherein at the first time point, the second set time has passed since the change of the detection signal of the second document sheet sensor 15b to the active state, and at the second time point, the first set time has passed since the change of the detection signal of the first document sheet sensor 15a to the active state.

In addition, in the present embodiment, the second time period during which the document sheet 90 is moving in a range including the first position P1 and the second position P2 in the document sheet conveyance path R0 is defined as follows. That is, the second period is from the second time point to a third time point, wherein at the third time point, the second set time has passed since the change of the detection signal of the second document sheet sensor 15b to the non-active state.

Furthermore, in the present embodiment, a third time period is defined as a time period required for the rear end of the document sheet 90 to pass the first position P1 from the second position P2 in the document sheet conveyance path R0. In other words, the third time period is from the third time point to a fourth time point, wherein at the fourth time point, the first set time has passed since the change of the detection signal of the first document sheet sensor 15a to the non-active state.

<Main Body Portion of Image Forming Apparatus 10>

The main body portion 2 of the image forming apparatus 10 includes devices for forming images on a recording sheet 9 in correspondence with image signals output from the first image sensor 13a and the second image sensor 13b. It is noted that the recording sheet 9 is a sheet-like image formation medium such as a sheet of paper, a sheet of coated paper, a postcard, an envelope, or an OHP sheet.

The main body portion 2 of the image forming apparatus 10 includes a sheet supplying portion 30, a sheet conveying portion 3, an image forming portion 4, a laser scanning portion 5, and a fixing portion 6. The image forming apparatus 10 shown in FIG. 1 is an electrophotographic image forming apparatus. It is noted that the image forming apparatus 10 may be an image forming apparatus of another method such as the inkjet method.

The sheet supplying portion 30 can store a plurality of recording sheets 9 stacked therein. The sheet conveying portion 3 includes a sheet feeding mechanism 31 and a sheet conveying mechanism 32.

The sheet feeding mechanism 31, which includes a roller that rotates upon contacting the recording sheet 9, feeds the recording sheet 9 from the sheet supplying portion 30 to a sheet conveyance path 300. The sheet conveying mechanism 32 then conveys the recording sheet 9 along the sheet conveyance path 300. With this configuration, the recording sheet 9 passes through the image forming portion 4 and the fixing portion 6, and then is discharged from a discharge port of the sheet conveyance path 300 onto a sheet discharge tray 101.

The image forming portion 4 includes a drum-like photoconductor 41, a charging device 42, a developing device 43, a transfer device 45, and a cleaning device 47. It is noted that the photoconductor 41 is an example of the image-carrying member that carries an image of developer.

The photoconductor 41 rotates, and the charging device 42 uniformly charges the surface of the photoconductor 41. In addition, the laser scanning portion 5 writes an electrostatic latent image on the charged surface of the photoconductor 41, by scanning a laser beam thereon. Furthermore, the developing device 43 develops the electrostatic latent image on the photoconductor 41 by the developer by supplying the developer to the photoconductor 41. It is noted that the developer is supplied to the developing device 43 from a developer supplying portion (not shown).

Furthermore, the transfer device 45 transfers the image (the image formed by the developer) on the surface of the photoconductor 41 to the recording sheet 9 that is moving between the photoconductor 41 and the transfer device 45. In addition, the cleaning device 47 removes the residual developer from the surface of the photoconductor 41.

The fixing portion 6 nips the recording sheet 9 with an image formed thereon, between a heating roller 61, in which is embedded a heater, and a pressure roller 62 and feeds the sheet to a downstream step. In this operation, the fixing portion 6 heats the image of the developer on the recording sheet 9 and fixes the image to the recording sheet 9.

The operation display portion 80 functions as an operation input portion which includes, for example, a touch panel and operation buttons, and also functions as a display portion which includes, for example, a liquid crystal display panel and a notification lamp.

The control portion 8 controls various types of electric devices included in the image forming apparatus 10, based on input information input through the operation display portion 80, and detection results of various types of sensors. Furthermore, the control portion 8 performs a signal processing and an image processing to image signals output from the first image sensor 13a and the second image sensor 13b.

Figure 4:
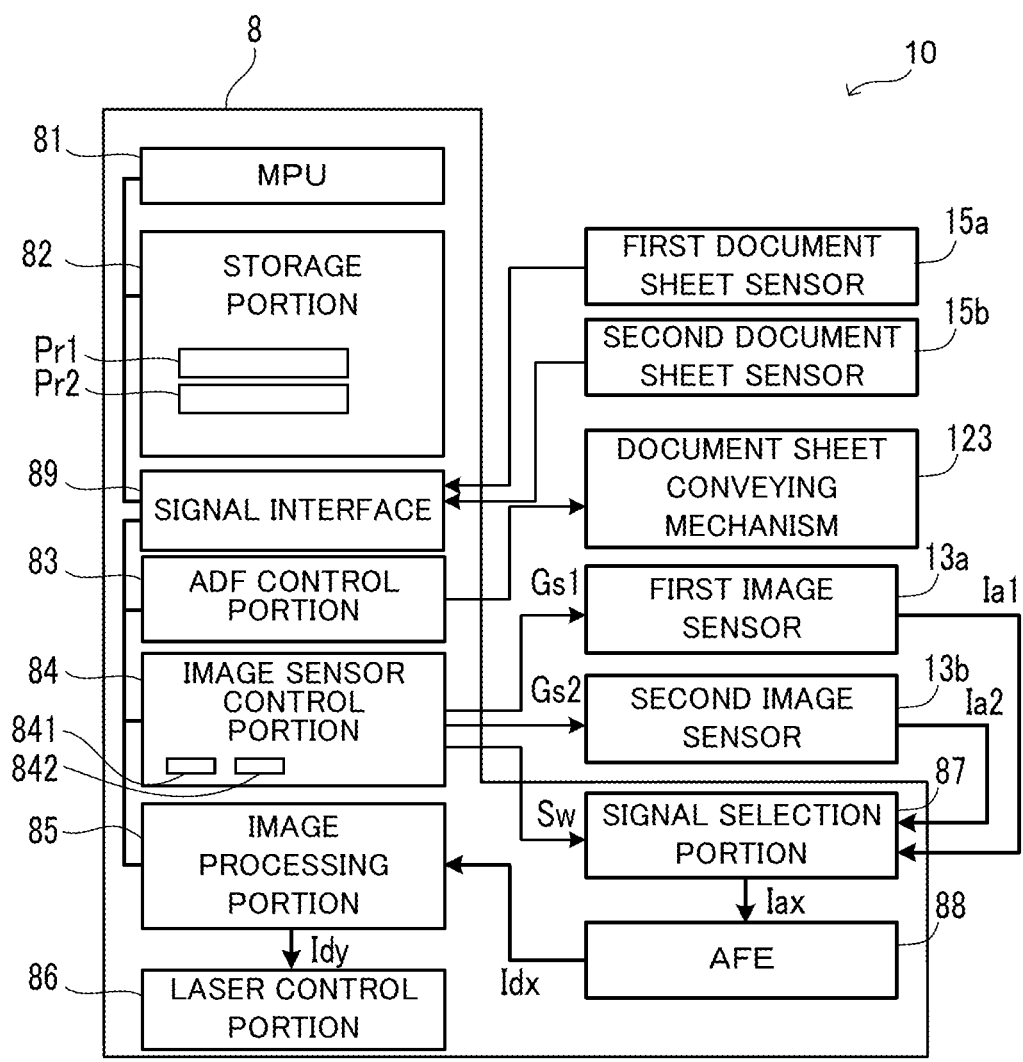
FIG. 4 is a block diagram of control-related equipment of the image forming apparatus including the image reading device according to an embodiment of the present disclosure.

As shown in FIG. 4, the control portion 8 includes, for example, a MPU (Micro Processor Unit) 81, a storage portion 82, an ADF control portion 83, an image sensor control portion 84, an image processing portion 85, an AFE 88, and a signal interface 89. Furthermore, the control portion 8 includes a laser control portion 86 that realizes the control function on the main body portion 2 side.

The MPU 81 is a processor configured to execute various types of calculation processes. The storage portion 82 is a non-volatile information storage medium in which programs Pr1 and Pr2 and other information are stored in advance, wherein the programs Pr1 and Pr2 cause the MPU 81 to execute various types of processes. The storage portion 82 is an information storage medium to/from which various types of information can be written and read by the MPU 81.

The control portion 8 comprehensively controls the image forming apparatus 10 by executing the various types of programs such as the programs Pr1 and Pr2 that are stored in the storage portion 82 in advance.

In the following description, among the processes executed by the image reading device 1, a process in which images are read from the document sheet 90 while the document sheet 90 is moving along the document sheet conveyance path R0 is referred to as a conveyed document sheet reading process. In addition, in the conveyed document sheet reading process, an operation mode for reading images from only the first surface of the document sheet 90 is referred to as a single-side mode, and an operation mode for reading images from both sides of the document sheet 90 is referred to as a double-side mode.

The MPU 81 selects either the single-side mode or the double-side mode in accordance with a predetermined selection operation performed on the operation display portion 80. The MPU 81 executes a process of selecting the operation mode by executing a mode selection program Pr1.

The ADF control portion 83 controls the document sheet feeding mechanism 122 and the document sheet conveying mechanism 123. When a predetermined start operation is performed on the operation display portion 80 in a state where a sensor (not shown) has detected that the document sheet 90 is set on the document sheet supply tray 121, the ADF control portion 83 activates the document sheet feeding mechanism 122 and the document sheet conveying mechanism 123. This allows the document sheet 90 to be conveyed along the document sheet conveyance path R0.

The image sensor control portion 84 controls the operation timing of the first image sensor 13a and the second image sensor 13b. The image sensor control portion 84 includes a sync signal output portion 841 and a selection signal output portion 842.

The sync signal output portion 841 has a function to output a first sync signal Gs1 to the first image sensor 13a, and a function to output a second sync signal Gs2 to the second image sensor 13b.

The first sync signal Gs1 indicates, to the first image sensor 13a, a timing at which to execute the process of reading a line of image of a color of the document sheet 90. In synchronization with the first sync signal Gs1, the first image sensor 13a reads a line of image which extends along the main scanning direction D1, from the first surface of the document sheet 90 and outputs the first image signal Ia1 corresponding to the read line of image.

The second sync signal Gs2 indicates, to the second image sensor 13b, a timing at which to execute the process of reading a line of image of a color from the document sheet 90. In synchronization with the second sync signal Gs2, the second image sensor 13b reads a line of image which extends along the main scanning direction D1, from the second surface of the document sheet 90 and outputs the second image signal Ia2 corresponding to the read line of image. It is noted that the first sync signal Gs1 and the second sync signal Gs2 may also be referred to as gate signals.

The sync signal output portion 841, in the single-side mode, outputs only the first sync signal Gs1 in a predetermined cycle, and in the double-side mode, outputs both the first sync signal Gs1 and the second sync signal Gs2 in a predetermined cycle.

The AFE 88 is a circuit that performs predetermined signal processing to the first image signal Ia1 and the second image signal Ia2 respectively output from the first image sensor 13a and the second image sensor 13b. The signal processing performed by the AFE 88 includes a signal amplifying process and an A/D conversion process, wherein in the signal amplifying process, the first image signal Ia1 and the second image signal Ia2 are amplified, and in the A/D conversion process, the first image signal Ia1 and the second image signal Ia2 that are analog are converted into digital image data Idx. Furthermore, the signal processing performed by the AFE 88 may include a level shift process in which the level of each of the first image signal Ia1 and the second image signal Ia2 is shifted. It is noted that the AFE 88 is an example of the image signal processing portion.

The image processing portion 85 performs various types of image processing by using the digital image data Idx obtained via the AFE 88 as input data. For example, the image processing portion 85 performs image processing such as a well-known shading correction process and a process for converting from data representing light amount to data representing density.

The laser control portion 86 controls the intensity of the laser beam of the laser scanning portion 5 based on the density information of each pixel in digital image data Idy on which the image processing has been performed by the image processing portion 85. This allows an electrostatic latent image to be formed on the surface of the photoconductor 41 in correspondence with the digital image data Idy.

The signal interface 89 is an interface circuit that relays signals among the MPU 81, the ADF control portion, the image sensor control portion 84, and various types of sensors.

Meanwhile, with regard to the image reading device 1, there is a demand for reducing the number of parts and the cost, while equipped with a function to read images from both sides of the document sheet 90.

The present embodiment provides the image reading device 1 and the image forming apparatus 10 with reduced number of parts and cost, while equipped with a function to read images from both sides of the document sheet 90.

In a conventional image processing apparatus that includes two image sensors for reading images from both sides of the document sheet 90, two AFEs are provided in correspondence with the two image sensors.

On the other hand, in the image reading device 1, a single AFE 88 executes, in time division, the processing of the first image signal Ia1 and the second image signal Ia2. That is, a single AFE 88 serves as both a signal processing portion for processing the first image signal Ia1 and a signal processing portion for processing the second image signal Ia2.

As shown in FIG. 4, the image reading device 1 includes a signal selection portion 87 configured to selectively transmit, to the AFE 88, either the first image signal Ia1 or the second image signal Ia2. Furthermore, the image sensor control portion 84 further includes a selection signal output portion 842.

The selection signal output portion 842 outputs a selection signal Sw that indicates, to the signal selection portion 87, to select the first image signal Ia1 or the second image signal Ia2. The signal selection portion 87 selects either the first image signal Ia1 or the second image signal Ia2 in accordance with the selection signal Sw, and transmits the selected signal to the AFE 88. In the following, the image signal transmitted to the AFE 88 via the signal selection portion 87 is referred to as a selected image signal Iax.

[Conveyed Document Sheet Reading Process]

Figure 5:
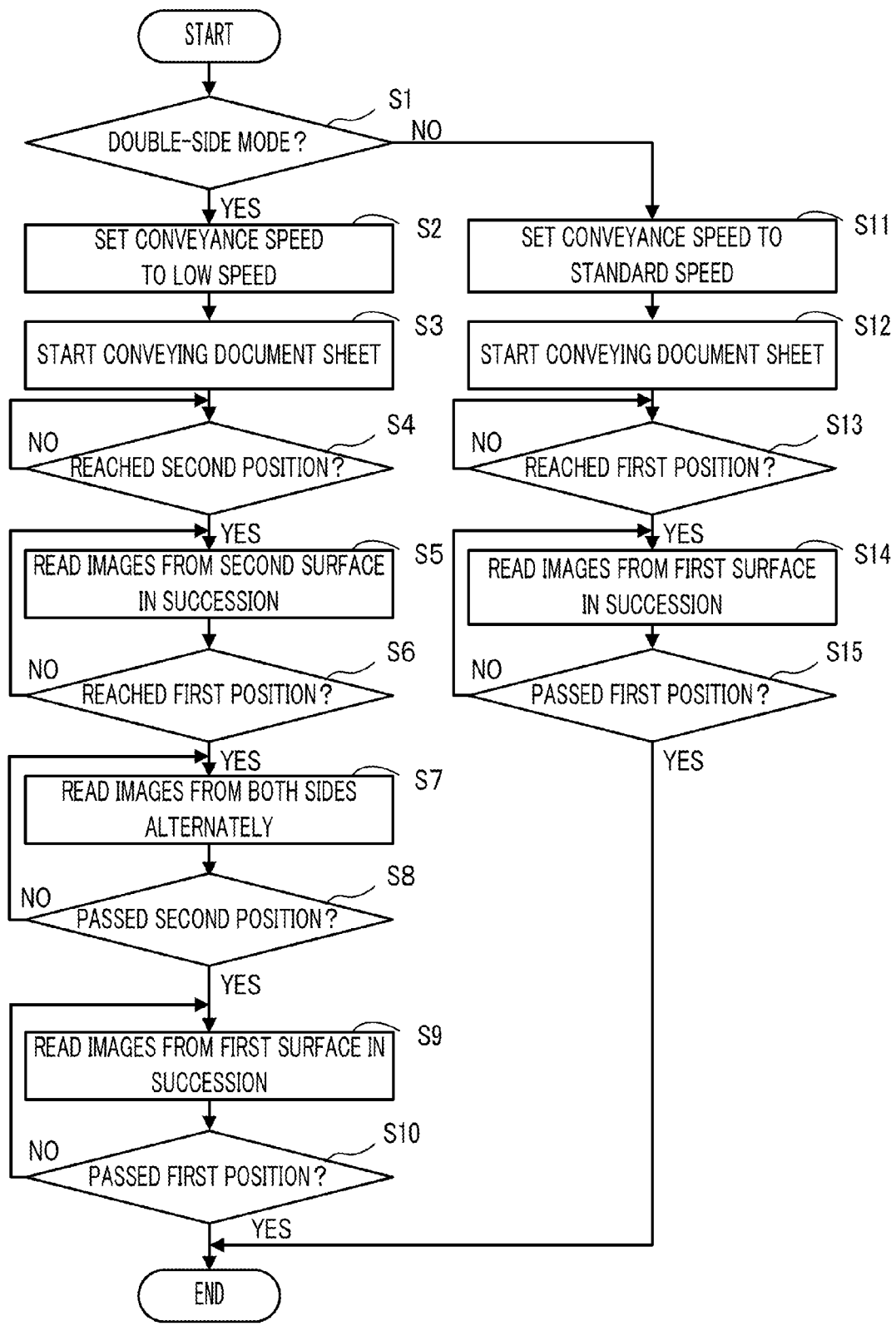
FIG. 5 is a flowchart showing an example of the procedure of a conveyed document sheet reading process executed in the image reading device according to an embodiment of the present disclosure.
Figure 6:
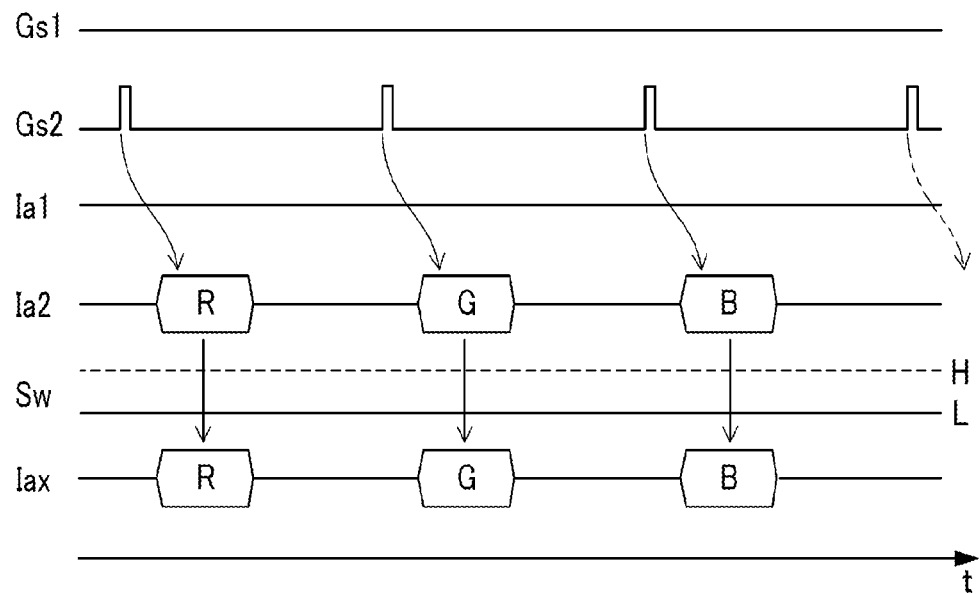
FIG. 6 is a time chart showing changes of various types of signals in the first stage of the conveyed document sheet reading process performed by the image reading device according to an embodiment of the present disclosure.
Figure 7:
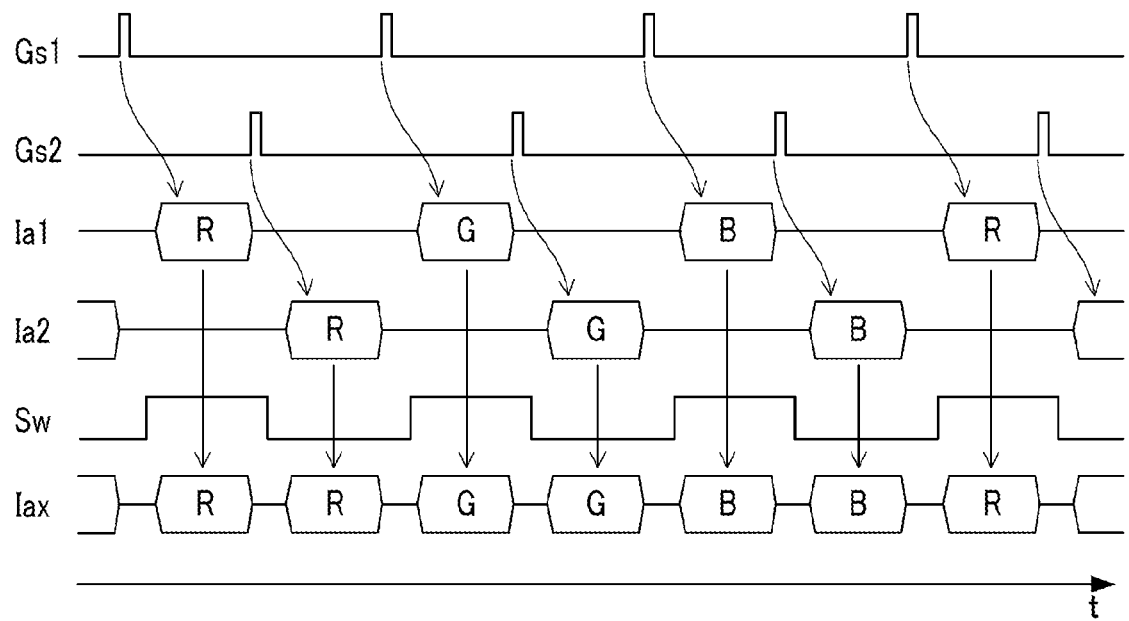
FIG. 7 is a time chart showing changes of various types of signals in the second stage of the conveyed document sheet reading process performed by the image reading device according to an embodiment of the present disclosure.
Figure 8:
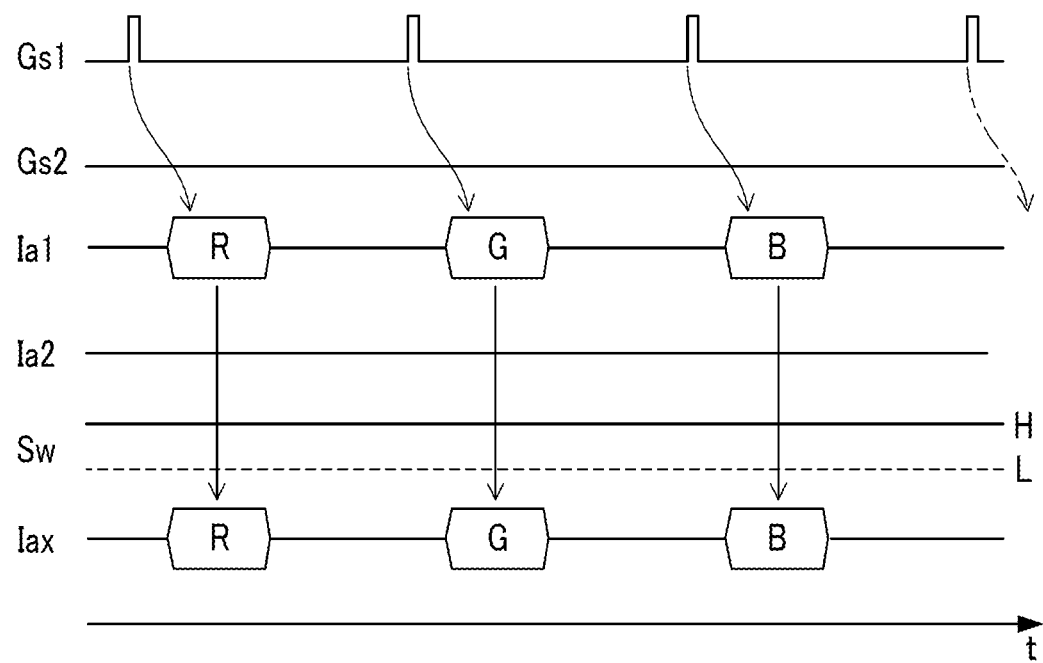
FIG. 8 is a time chart showing changes of various types of signals in the third stage of the conveyed document sheet reading process performed by the image reading device according to an embodiment of the present disclosure.

Next, an example of the procedure of the conveyed document sheet reading process executed in the image reading device 1 is described with reference to FIGS. 5-8. FIG. 5 is a flowchart showing an example of the procedure of the conveyed document sheet reading process executed in the image reading device 1. In addition, FIGS. 6-8 are time charts showing changes of various types of signals in the first, second and third stages of the conveyed document sheet reading process performed by the image reading device 1. In the time charts of FIGS. 6-8 showing the states of the first image signal Ia1, the second image signal Ia2, and the selected image signal Iax, "R", "G", and "B" respectively indicate that a red image signal, a green image signal, and a blue image signal are output.

When a predetermined start operation is performed on the operation display portion 80 in a state where a sensor (not shown) has detected that the document sheet 90 is set on the document sheet supply tray 121, the MPU 81 starts the conveyed document sheet reading process. In the following description, S1, S2, . . . are identification signs representing the steps executed by the control portion 8.

<Step S1>

In the conveyed document sheet reading process, first, the MPU 81 determines which of the double-side mode and the single-side mode has been selected as the operation mode. Upon determining that the double-side mode has been selected, the MPU 81 moves the process to step S2. In addition, upon determining that the single-side mode has been selected, the MPU 81 moves the process to step S11 which is described below.

<Steps S2, S3>

When the double-side mode has been selected, the MPU 81 sets the conveyance speed of the document sheet 90 to be lower than the standard speed by executing a speed setting program Pr2 (S2). As described below, the standard speed is a conveyance speed of the document sheet 90 that is set when the single-mode is selected. For example, in step S2, the conveyance speed of the document sheet 90 is set to half the standard speed. It is noted that the MPU 81 that executes the speed setting program Pr2 functions as a low-speed setting portion that sets the conveyance speed of the document sheet 90 to be lower than the standard speed.

Furthermore, the ADF control portion 83 causes the document sheet feeding mechanism 122 to feed the document sheet 90 and then causes the document sheet conveying mechanism 123 to start conveying the document sheet 90 (S3). In step S3, the document sheet conveying mechanism 123 conveys the document sheet 90 at the speed set in step S2.

<Step S4>

Subsequently, the image sensor control portion 84 monitors the change of the detection signal of the second document sheet sensor 15b, and determines whether or not the front end of the document sheet 90 has reached the second position P2. In this determination process, the start time point of the first time period is detected. As described above, the first time period is a time period required for the front end of the document sheet 90 to reach the first position P1 from the second position P2 in the document sheet conveyance path R0.

<Step S5, S6>

In the first time period, the sync signal output portion 841 of the image sensor control portion 84 outputs only the second sync signal Gs2 in succession in a predetermined cycle (S5). This allows the second image sensor 13b to execute the process of reading an image from an area which extends from the front end to a middle position on the second surface of the document sheet 90 (S5).

The image sensor control portion 84 monitors the change of the detection signal of the first document sheet sensor 15a during execution of the process of step S5, and determines whether or not the front end of the document sheet 90 has reached the first position P1 (S6). The time point at which the front end of the document sheet 90 reaches the first position P1 is the end time point of the first time period and the start time point of the second time period.

FIG. 6 is a time chart showing changes of various types of signals in the first time period. As shown in FIG. 6, in the first time period, the first sync signal Gs1 is not output, and only the second sync signal Gs2 is output in a predetermined cycle.

In addition, in the first time period, the second image sensor 13b at the second position P2 reads an image from the second surface of the document sheet 90 and outputs the second image signal Ia2 that corresponds to the read image, in synchronization with the second sync signal Gs2.

In step S5, the second image sensor 13b reads lines of images from the second surface of the document sheet 90 one by one and one color by one color of the three colors R, G and B in synchronization with the second sync signal Gs2.

Furthermore, in step S5, the image sensor control portion 84 continues to output the selection signal Sw that indicates to select the second image signal Ia2, to the signal selection portion 87. This allows the second image signals Ia2 that respectively correspond to the lines of images of respective colors to be transmitted in sequence to the AFE 88 as the selected image signals Iax.

Furthermore, in step S5, the AFE 88 performs predetermined signal processing to the second image signals Ia2 that are output in sequence from the second image sensor 13b.

Furthermore, in step S5, the image processing portion 85 performs the predetermined image processing to the digital image data Idx that is output in sequence from the AFE 88.

It is noted that in FIGS. 6-8, the selection signal Sw indicating to select the first image signal Ia1 is a Low signal, and the selection signal Sw indicating to select the second image signal Ia2 is a High signal.

<Steps S7, S8>

Subsequently, in the second time period when the double-side mode has been selected, the sync signal output portion 841 outputs the first sync signal Gs1 and the second sync signal Gs2 alternately in a predetermined cycle (S7). This allows the first image sensor 13a to alternately execute a process of reading an image extending from the front end to a middle position of the image on the first surface of the document sheet 90, and a process of reading an image extending from the middle position to the rear end of the image on the second surface of the document sheet 90 (S7).

The image sensor control portion 84 monitors the change of the detection signal of the second document sheet sensor 15b during the execution of step S7, and determines whether or not the rear end of the document sheet 90 has passed the second position P2 (S8). The time point at which the rear end of the document sheet 90 passes the second position P2 is the end time point of the second time period, and is the start time point of the third time period.

FIG. 7 is time chart showing changes of various types of signals in the second time period. As shown in FIG. 7, in the second time period, the first sync signal Gs1 and the second sync signal Gs2 are output alternately in a predetermined cycle.

In addition, in the second time period, the first image sensor 13a at the first position P1 reads an image from the first surface of the document sheet 90 and outputs the first image signal Ia1 that corresponds to the read image, in synchronization with the first sync signal Gs1.

Furthermore, in the second time period, the second image sensor 13b at the second position P2 reads an image from the second surface of the document sheet 90 and outputs the second image signal Ia2 corresponding to the read image, in synchronization with the second sync signal Gs2.

In step S7, the first image sensor 13a reads lines of images from the first surface of the document sheet 90 one by one and one color by one color of the three colors R, G and B in synchronization with the first sync signal Gs1. Furthermore, in step S7, the second image sensor 13b reads lines of images from the second surface of the document sheet 90 one by one and one color by one color of the three colors R, G and B in synchronization with the second sync signal Gs2.

Furthermore, in step S7, the image sensor control portion 84 alternately outputs the selection signal Sw indicating to select the first image signal Ia1 and the selection signal Sw indicating to select the second image signal Ia2, to the signal selection portion 87.

More specifically, during a time period in which the first image sensor 13a is outputting the first image signal Ia1 in synchronization with the first sync signal Gs1, the image sensor control portion 84 outputs the selection signal Sw indicating to select the first image signal Ia1. In addition, during a time period in which the second image sensor 13b is outputting the second image signal Ia2 in synchronization with the second sync signal Gs2, the image sensor control portion 84 outputs the selection signal Sw indicating to select the second image signal Ia2. This allows the first image signal Ia1 and the second image signals Ia2 that respectively correspond to the lines of images of respective colors to be transmitted alternately to the AFE 88 as the selected image signals Iax.

Furthermore, in step S7, the AFE 88 performs a predetermined signal processing in sequence to the first image signal Ia1 and the second image signal Ia2 that are alternately output from the first image sensor 13a and the second image sensor 13b. The AFE 88 is an example of the image signal processing portion.

Furthermore, in step S7, the image processing portion 85 performs a predetermined image processing to the digital image data Idx that is output from the AFE 88 in sequence.

It is noted that step S7 is an example of a step in which the sync signal output portion 841 alternately outputs the first sync signal Gs1 and the second sync signal Gs2 while the document sheet 90 is moving in a range including the first position P1 and the second position P2.

Furthermore, step S7 is also an example of a step in which the first image sensor 13a reads an image from the first surface of the document sheet 90 at the first position P1 and outputs the first image signal Ia1 corresponding to the read image.

Furthermore, step S7 is also an example of a step in which the second image sensor 13b reads an image from the second surface of the document sheet 90 at the second position P2 and outputs the second image signal Ia2 corresponding to the read image, in synchronization with the second sync signal Gs2.

Furthermore, step S7 is also an example of a step in which the AFE 88 performs the predetermined signal processing in sequence to the first image signal Ia1 and the second image signal Ia2 that are alternately output from the first image sensor 13a and the second image sensor 13b.

<Steps S9, S10>

In the third time period, the sync signal output portion 841 of the image sensor control portion 84 outputs only the first sync signal Gs1 in succession in a predetermined cycle (S9). This allows the first image sensor 13a to execute the process of reading an image from an area which extends from the middle position to the rear end on the first surface of the document sheet 90 (S9).

The image sensor control portion 84 monitors the change of the detection signal of the first document sheet sensor 15a during execution of the process of step S9, and determines whether or not the rear end of the document sheet 90 has passed the first position P1 (S10). The time point at which the rear end of the document sheet 90 passes the first position P1 is the end time point of the third time period.

FIG. 8 is time chart showing changes of various types of signals in the third time period. As shown in FIG. 8, in the third time period, the second sync signal Gs2 is not output, and only the first sync signal Gs1 is output in a predetermined cycle.

In addition, in the third time period, the first image sensor 13a at the first position P1 reads an image from the first surface of the document sheet 90 and outputs the first image signal Ia1 that corresponds to the read image, in synchronization with the first sync signal Gs1.

In step S9, the first image sensor 13a reads lines of images from the first surface of the document sheet 90 one by one and one color by one color of the three colors R, G and B in synchronization with the first sync signal Gs1.

In addition, in step S9, the image sensor control portion 84 continues to output the selection signal Sw that indicates to select the first image signal Ia1, to the signal selection portion 87. This allows the first image signals Ia1 that respectively correspond to the lines of images of respective colors to be transmitted in sequence to the AFE 88 as the selected image signals Iax.

Furthermore, in step S9, the AFE 88 performs the predetermined signal processing to the first image signals Ia1 that are output in sequence from the first image sensor 13a.

Furthermore, in step S9, the image processing portion 85 performs the predetermined image processing to the digital image data Idx that is output from the AFE 88 in sequence.

Upon detecting that the rear end of the document sheet 90 has passed the first position P1, the conveyed document sheet reading process ends.

<Steps S11, S12>

On the other hand, when the single-side mode has been selected, the MPU 81, by executing the speed setting program Pr2, sets the conveyance speed of the document sheet 90 to the standard speed that is faster than the speed set in step S2 (S11). Furthermore, the ADF control portion 83 causes the document sheet feeding mechanism 122 to feed the document sheet 90, and then causes the document sheet conveying mechanism 123 to start conveying the document sheet 90 (S12). The conveyance speed at which the document sheet conveying mechanism 123 conveys the document sheet 90 in step S12 is the standard speed set in step S11. It is noted that the MPU 81 that executes the speed setting program Pr2 functions as a standard speed setting portion that sets the standard speed as the conveyance speed of the document sheet 90.

<Step S13>

Subsequently, the image sensor control portion 84 monitors the change of the detection signal of the first document sheet sensor 15a, and determines whether or not the front end of the document sheet 90 has reached the first position P1. This determination process is a process in which the start time point of the second time period is detected.

<Steps S14, S15>

In a time period from the start time point of the second time period to the end time point of the third time period, the sync signal output portion 841 outputs only the first sync signal Gs1 in succession in a predetermined cycle (S14). This allows the first image sensor 13a to execute the process of reading an image of an area which extends from the front end to the rear end on the first surface of the document sheet 90 (S14).

The image sensor control portion 84 monitors the change of the detection signal of the first document sheet sensor 15a during execution of the process of step S14, and determines whether or not the rear end of the document sheet 90 has passed the first position P1 (S15). The time point at which the rear end of the document sheet 90 passes the first position P1 is the end time point of the third time period.

In step S14, the states of the first sync signal Gs1, the first image signal Ia1, the selection signal Sw, and the selected image signal Iax transition as shown in the time chart of FIG. 8. It is noted, however, that the cycle in which the first sync signal Gs1 is output and the cycle in which the selection signal Sw changes in step S14 are shorter than those in step S9.

More specifically, the ratio of the output period of the first sync signal Gs1 in step S9 to that in step S14 is inversely proportional to the ratio of the conveyance speed of the document sheet 90 set in step S2 to that is step S11.

In addition, in step S14, the first image sensor 13*a* at the first position P1 reads an image from the first surface of the document sheet 90 and outputs the first image signal Ia1 corresponding to the read image, in synchronization with the first sync signal Gs1.

In step S14, the first image sensor 13*a* reads lines of images from the first surface of the document sheet 90 one by one and one color by one color of the three colors R, G and B in synchronization with the first sync signal Gs1.

Furthermore, in step S14, the image sensor control portion 84 continues to output the selection signal Sw that indicates to select the first image signal Ia1, to the signal selection portion 87. This allows the first image signals Ia1 that respectively correspond to the lines of images of respective colors to be transmitted in sequence to the AFE 88 as the selected image signals Iax.

Furthermore, in step S14, the AFE 88 performs the predetermined signal processing to the first image signals Ia1 that are output in sequence from the first image sensor 13*a*.

Furthermore, in step S14, the image processing portion 85 performs the predetermined image processing to the digital image data Idx that is output in sequence from the AFE 88.

Upon detecting that the rear end of the document sheet 90 has passed the first position P1, the conveyed document sheet reading process ends.

When the double-side mode has been selected in the image reading device 1, the first image sensor 13*a* and the second image sensor 13*b* alternately operate, and the AFE 88 executes, in time division, the processing of the first image signal Ia1 and the second image signal Ia2.

The image reading device 1 realizes the function to read images from both sides of the document sheet 90 by a configuration including less AFEs than the conventional configuration. As a result, the number of parts and the cost can be reduced.

Furthermore, according to the present embodiment, the image processing portion 85 processes the digital image data Idx that corresponds to the first image signal Ia1 and the second image signal Ia2. As a result, the number of parts and the cost regarding the image processing portion 85 can also be reduced.

In addition, the document sheet conveying mechanism 123 conveys the document sheet 90 at a lower speed in the double-side mode than in the single-side mode (S3, S12). As a result, the AFE 88 and the image processing portion 85 that have sufficient processing ability for the single-side mode, can be shared in both the single-side mode and the double-side mode.

In addition, in the double-side mode, the first image sensor 13*a* and the second image sensor 13*b* read lines of images from the document sheet 90 one by one in synchronization with the first sync signal Gs1 and the second sync signal Gs2, respectively, the lines of images each extending along the main scanning direction D1 (S5, S7, S9). As a result, the cycle in which image signals transmitted to the AFE 88 are switched from one to another is avoided from becoming too short.

Furthermore, in general, the signal processing performed by the AFE 88, such as the A/D conversion process, is commonly performed when images are read from both sides of the document sheet 90 and when lines of images are read one by one. As a result, the AFE 88 is particularly suitable as an image signal processing portion that processes both the first image signal Ia1 and the second image signal Ia2.

Application Examples

In the above-described embodiment, the document sheet conveying mechanism 123 may convey the document sheet 90 at the standard speed in the first time period and the third time period, and may convey the document sheet 90 at a speed lower than the standard speed in the second time period.

It is noted that the image reading device, the image forming apparatus, and the image reading method of the present disclosure may be configured by, within the scope of claims, freely combining the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
    a document sheet conveying portion configured to convey a document sheet along a predetermined document sheet conveyance path;
    a sync signal outputting portion executable by a processor configured to output a first sync signal and a second sync signal;
    a first image sensor configured to read lines of an image from a first surface of the document sheet one by one at a first position in the document sheet conveyance path and output a first image signal corresponding to the image read at the first position, in synchronization with the first sync signal, the lines of the image each extending along a main scanning direction that is perpendicular to a conveyance direction of the document sheet;
    a second image sensor configured to read lines of an image from a second surface of the document sheet one by one at a second position located in an upstream side of the first position in the conveyance direction of the document sheet in the document sheet conveyance path and output a second image signal corresponding to the image read at the second position, in synchronization with the second sync signal, the lines of the image each extending along the main scanning direction; and
    an image signal processing portion executable by the processor configured to perform a predetermined signal processing to the first image signal and the second image signal, wherein
    in a double-side mode in which images on both sides of the document sheet are read, the sync signal outputting portion, during a first time period required for the document sheet to reach the first position from the second position, outputs only the second sync signal in a predetermined cycle, during a second time period in which the document sheet is moving in a range including the first position and the second position, alternately outputs the first sync signal and the second sync signal in a predetermined cycle, and during a third time period required for the document sheet to pass the first position from the second position, outputs only the first sync signal in a predetermined cycle, and the image signal processing portion, during the first time period, performs the signal processing to the second image signal, during the second time period, performs the signal processing in sequence to the first image signal and the second image signal that are output alternately, and during the third time period, performs the signal processing to the first image signal.

2. The image reading device according to claim 1, wherein the document sheet conveying portion conveys the document sheet at a lower speed in the double-side mode than in a single-side mode in which an image is read from only a single side of the document sheet.

3. The image reading device according to claim 1, wherein the first image sensor and the second image sensor read lines of images from both sides of the document sheet one by one and one color by one color of predetermined three colors in synchronization with the first sync signal and the second sync signal, respectively.

4. The image reading device according to claim 1, wherein the signal processing performed by the image signal processing portion includes a process in which the first image signal and the second image signal that are analog are converted into digital image data.

5. An image forming apparatus comprising the image reading device according to claim 1.

6. An image reading method for reading images from both sides of a document sheet conveyed along a predetermined document sheet conveyance path by a first image sensor configured to read an image from a first surface of the document sheet at a first position in the document sheet conveyance path in synchronization with a first sync signal, and a second image sensor configured to, in synchronization with a second sync signal, read an image from a second surface of the document sheet at a second position located in an upstream side of the first position in a conveyance direction of the document sheet in the document sheet conveyance path, the image reading method comprising:

during a first time period required for the document sheet to reach the first position from the second position, outputting, by a sync signal outputting portion, only the second sync signal in a predetermined cycle, during a second time period in which the document sheet is moving in a range including the first position and the second position, alternately outputting, by the sync signal outputting portion, the first sync signal and the second sync signal, during a third time period required for the document sheet to pass the first position from the second position, outputting, by the sync signal outputting portion, only the first sync signal in a predetermined cycle, during the first time period and the second time period, by the second image sensor, reading lines of the image from the second surface of the document sheet one by one and outputting a second image signal corresponding to the read image, in synchronization with the second sync signal, the lines of the image each extending along a main scanning direction that is perpendicular to the conveyance direction of the document sheet, during the second time period and the third time period, by the first image sensor, reading lines of the image from the first surface of the document sheet one by one and outputting a first image signal corresponding to the read image, in synchronization with the first sync signal, the lines of the image each extending along the main scanning direction, during the first time period, by an image signal processing portion, performing a predetermined signal processing to the second image signal output from the second image sensor, during the second time period, by the image signal processing portion, performing the signal processing in sequence to the first image signal and the second image signal that are output alternately from the first image sensor and the second image sensor, and during the third time period, by the image signal processing portion, performing the signal processing to the first image signal output from the first image sensor.

* * * * *